United States Patent [19]

Van Drumpt et al.

[11] 4,347,342

[45] Aug. 31, 1982

[54] PROCESS FOR INITIATING RADICAL REACTIONS EMPLOYING HYDROXIMIC ACID DERIVATIVES

[75] Inventors: Jan D. Van Drumpt, Deventer; Wilhelmus M. Beijleveld, Olst, both of Netherlands

[73] Assignee: Akzona Incorporated, Asheville, N.C.

[21] Appl. No.: 236,342

[22] Filed: Feb. 20, 1981

[30] Foreign Application Priority Data

Feb. 29, 1980 [NL] Netherlands .................... 8001231

[51] Int. Cl.$^3$ .................. C08G 17/14; C08F 27/00
[52] U.S. Cl. ................................. 525/374; 526/217
[58] Field of Search ................... 325/374; 526/217

[56] References Cited

U.S. PATENT DOCUMENTS

| | | | |
|---|---|---|---|
| 3,454,506 | 7/1969 | Brock | 525/374 |
| 4,007,165 | 2/1977 | MacLeay | 526/219 |

FOREIGN PATENT DOCUMENTS

| | | | |
|---|---|---|---|
| 2705034 | 11/1977 | Fed. Rep. of Germany | 525/374 |
| 874289 | 8/1961 | United Kingdom | 525/374 |
| 1169988 | 11/1969 | United Kingdom | 525/374 |

OTHER PUBLICATIONS

J. E. Johnson et al., J. Org. Chem., vol. 36, No. 2, 1971.

*Primary Examiner*—William F. Hamrock
*Assistant Examiner*—Peter F. Kulkosky
*Attorney, Agent, or Firm*—F. W. Young; Daniel N. Christus

[57] ABSTRACT

This disclosure relates to an improved process for initiating radical reactions employing a class of hydroximic acid derivatives as initiators. Radical reactions initiated by such hydroximic acid derivatives include copolymerization of unsaturated polyester resins and crosslinking of polyethylene. The initiators of the present disclosure have a higher degradation temperature than found with typical peroxides.

19 Claims, No Drawings

PROCESS FOR INITIATING RADICAL REACTIONS EMPLOYING HYDROXIMIC ACID DERIVATIVES

The present invention relates to a process for initiating radical reactions. In particular, the invention relates to a process for initiating radical reactions employing a hydroximic acid derivative as an initiator.

The process of the present invention relates to an improved method of initiating radical reactions, the improvement comprises employing an initiator selected from the class of compounds of the formula:

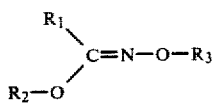

wherein
R$_1$ is selected from the class consisting of substituted or unsubstituted: C$_1$–C$_{22}$ alkyl, C$_2$–C$_{22}$ alkenyl, C$_6$–C$_{20}$ cyclohexyl, C$_6$–C$_{20}$ phenyl and C$_7$–C$_{20}$ aralkyl;

R$_2$ is selected from the class consisting of substituted or unsubstituted: C$_1$–C$_{20}$ alkyl, C$_2$–C$_{20}$ alkenyl, C$_6$–C$_{20}$ cyclohexyl, C$_6$–C$_{20}$ phenyl, C$_7$–C$_{20}$ aralkyl, C$_2$–C$_{21}$ alkylcarbonyl, C$_3$–C$_{21}$ alkenylcarbonyl, C$_7$–C$_{21}$ cyclohexylcarbonyl, C$_7$–C$_{21}$ phenylcarbonyl, C$_8$–C$_{21}$ aralkylcarbonyl, C$_7$–C$_{21}$ alkoxycarbonyl, C$_3$–C$_{21}$ alkenyloxycarbonyl, C$_7$–C$_{21}$ cyclohexyloxycarbonyl, C$_7$–C$_{21}$ phenoxycarbonyl and C$_8$–C$_{21}$ aralkyloxycarbonyl; and R$_3$ is hydrogen, a group selected from the class consisting of substituted or unsubstituted: C$_1$–C$_{20}$ alkyl, C$_2$–C$_{20}$ alkenyl, C$_6$–C$_{20}$ cyclohexyl, C$_6$–C$_{20}$ phenyl, C$_7$–C$_{20}$ aralkyl, C$_2$–C$_{21}$ alkylcarbonyl, C$_3$–C$_{21}$ alkenylcarbonyl, C$_7$–C$_{21}$ cyclohexylcarbonyl, C$_7$–C$_{21}$ phenylcarbonyl, C$_8$–C$_{21}$ aralkylcarbonyl, C$_7$–C$_{21}$ alkoxycarbonyl, C$_3$–C$_{21}$ alkenyloxycarbonyl, C$_7$–C$_{21}$ cyclohexyloxycarbonyl, C$_7$–C$_{21}$ phenyloxycarbonyl and C$_8$–C$_{21}$ aralkyloxycarbonyl; a

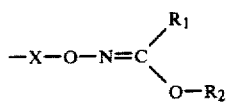

group wherein X is substituted or unsubstituted: C$_1$–C$_{12}$ alkylene, C$_2$–C$_{12}$ alkenylene, C$_6$–C$_{12}$ cycloalkylene or phenylene; or a —SO$_2$Y group wherein Y is substituted or unsubstituted: C$_1$–C$_{20}$ alkyl, C$_6$–C$_{20}$ cycloalkyl or phenyl.

The "alkyl" and "alkenyl" radicals referred to above include primary, secondary, as well as tertiary alkyl and alkenyl groups. In addition, the groups represented by R$_1$, R$_2$, R$_3$, X and Y may be substituted at one or more positions. Suitable substituents include, for example, alkyl, cyclohexyl, phenyl, phenyloxy, aralkyl, aralkyloxy, carboxyl, amino, nitro, or halogen groups. If a halogen group is employed as a substituent, chlorine is preferred.

Some of the initiators employed in the process of the present invention are described in German Pat. No. 2,705,034. Also, a number of these compounds are disclosed in Annalen 281, 169 (1894); American Chemical Journal 20, 1 (1898); American Chemical Journal 33, 60 (1905); Berichte 24, 3447 (1891); Australian Journal of Chemistry 22, 161 (1969); Journal of Organic Chemistry 36 (2), 284 (1971); Journal of Organic Chemistry 37, 3520 (1972), and Journal of the Chemical Society 1080 (1977). The above references fail to suggest that the described compounds can be employed as initiators.

Hydroximic acid derivatives of the present invention may be utilized as initiators in a numerous radical reactions. It is preferred that these compounds be employed in reactions that are initiated thermally and in particular reactions that are carried out within a temperature range of 50°–350° C. Examples of such reactions include homo- or copolymerization of alpha-olefins, copolymerization of unsaturated polyester resins, cross-linking of rubbers and thermoplastics, radical substitution and radical elimination reactions, including halogen substitutions. It is preferred that the compounds of the present invention are applied in the copolymerization of unsaturated polyester resins and in the cross-linking of polymers.

U.S. Pat. No. 3,367,994 describes unsaturated polyester resins as mixtures of unsaturated polyesters and monomers containing one or more vinyl, or vinylidene groups, such as styrene, vinyl toluene, methylmethacrylate, diallyl phthalate and divinyl benzene. The ratio of monomer to unsaturated polymer is generally in the range of from 30–50% by weight of monomer to 70–50% by weight of polyester. An unsaturated polyester is obtained by reacting approximately equivalent quantities of a polyvalent alcohol, such as ethylene glycol, propylene glycol, or diethylene glycol, and an unsaturated dibasic carboxylic acid, such as maleic acid, fumaric acid, itaconic acid, or the corresponding acid anhydrides. In addition, if desired, a saturated acid, such as phthalic acid, isophthalic acid, tetrachlorophthalic acid, malonic acid, adipic acid, succinic acid, sebacic acid and the like, may be employed.

Copolymerization is generally carried out at a temperature in a range of 0°–200° C. and preferably 50°–150° C. In general, 0.1–10% by weight and preferably 0.5–2.0% by weight of an initiator of the present invention are added to the polyester resin to be copolymerized. In addition, accelerators, such as ferrinaphthenate or ferriacetyl acetonate, may also be employed.

Examples of polymers that may be cross-linked according to the process for the present invention include polyethylene, chlorosulfonated polyethylene, chlorinated polyethylene, polybutene-1, polyisobutene, ethylene-vinyl acetate copolymers, ethylene-propylene copolymers, polybutadiene, polyisoprene, polychloroprene, butadiene-styrene copolymers, natural rubber, polyacrylate rubber, butadiene-acrylonitrile copolymers, acrylonitrile-butadiene-styrene terpolymers, silicone rubber, polyurethanes and polysulfides.

It is preferred to utilize the processes of the present invention in cross-linking polyethylene and copolymers of ethylene and propylene (EPM and EPDM). In general, 0.1–10% by weight and preferably 1–3% by weight of an hydroximic acid derivative initiator are added to the polymer to be cross-linked. It is preferred that the cross-linking be carried out in the presence of co-agents, such as triallyl cyanurate, trimethylol propane trimethyl acrylate, or low-molecular polybutadienes. It is most preferred to employ triallyl cyanurate as a co-agent. Generally, 0.5–5.0% by weight of a co-agent are employed. The cross-linking reaction is generally carried out at a temperature in a range of 150°–300° C.

Although the specific reaction mechanism according to which the process of the present invention proceeds is not generally known, it is plausible to assume that, upon thermal decomposition, the initiators, at least partly disintegrate into three fragments, in particular a nitrile compound ($R_1-C\equiv N$) and two radicals ($R_2O\bullet$ and $R_3O\bullet$). This disintegration produces the same radicals which are formed as a result of the decomposition of an organic peroxide of the formula: $R_2-O-O-R_3$. The organic peroxides of this formula are referred to hereinafter as peroxides "corresponding" to the hydroximic acid derivatives. It has been found that the decomposition temperatures of hydroximic acid derivatives employed in the process of the present invention are 40°–120° C. higher than that of the "corresponding" organic peroxides. Consequently, the hydroximic acid derivatives are in general safer than the "corresponding" peroxides. This higher decomposition temperature is advantageous in a number of applications, especially those applications wherein an increase in reaction temperature and/or maximum permissible processing temperature leads to a lower viscosity and better processability of the reaction mass. Improved processability is of particular importance in cross-linking reactions for thermoplastics.

It should be noted that as with conventional peroxides, the practical utility of a hydroximic acid derivative in initiating radical reactions is not only generated by the type of radicals produced but also by the rate at which they are produced at a particular reaction temperature. There is of course no point in applying hydroximic acid derivatives at a temperature at which for practical purposes too few radicals are formed per unit time.

The following hydroximic acid derivatives have been found to be particularly effective as initiators in thermal radical reactions. Mixtures of such hydroximic acid derivatives may also be employed in the process of the present invention. The hydroximic acid derivatives are listed below in different classifications. The limitations for $R_1$, $R_2$, X and Y in each classification correspond to the known limitations for the corresponding peroxides classified as such.

The first class includes hydroximic acid derivatives, wherein $R_1$ is above defined, $R_2$ is substituted or unsubstituted: $C_1-C_{20}$ alkyl, $C_2-C_{20}$ alkenyl, cyclohexyl or $C_7-C_{20}$ aralkyl, and $R_3$ is hydrogen. Compounds representative of this class include ethyl dodecane hydroximate, allyl acetohydroximate, cyclohexyl benzohydroximate and cumyl benzohydroximate. The peroxides "corresponding" to this class of hydroximic acid derivatives are commonly referred to as hydroperoxides.

A second class of compounds includes hydroximic acid derivatives wherein $R_1$ is above defined and $R_2$ and $R_3$ are independently substituted or unsubstituted: $C_1-C_{20}$ alkyl, cyclohexyl or $C_7-C_{20}$ aralkyl. Compounds representative of this class include ethyl-O-ethyl benzohydroximate, tertiary butyl-O-ethyl dodecanehydroximate, cumyl-O-methyl acetohydroximate and tertiary butyl-O-tertiary butylbenzohydroximate. The peroxides "corresponding" to this class of hydroximic acid derivatives are commonly referred to as dialkyl peroxides.

A third class of compounds includes hydroximic acid derivatives wherein $R_1$ is above defined and $R_2$ and $R_3$ are independently substituted or unsubstituted: $C_7-C_{21}$ phenylcarbonyl. Compounds representative of this class include benzoic-O-benzoyl benzohydroximic anhydride and trimethylaceto-O-benzoyl benzohydroximic anhydride. The peroxides "corresponding" to this class of hydroximic acid derivatives are referred to as diacyl peroxides.

A fourth class includes hydroximic acid derivatives wherein $R_1$ is above defined, $R_2$ is selected from the group consisting of substituted or unsubstituted: $C_1-C_{20}$ alkyl, $C_2-C_{20}$ alkenyl, cyclohexyl, phenyl and $C_7-C_{20}$ aralkyl; and $R_3$ is selected from the group consisting of substituted or unsubstituted: $C_2-C_{21}$ alkoxycarbonyl, $C_3-C_{21}$ alkenyloxycarbonyl, $C_7-C_{21}$ cyclohexyloxycarbonyl, $C_7-C_{21}$ phenyloxycarbonyl and $C_8-C_{21}$ aralkyloxycarbonyl. Compounds representative of this class include ethyl-O-(isopropyloxycarbonyl)-dodecanehydroximate, and propyl-O-(cyclohexyloxycarbonyl)-benzohydroximate. The peroxides "corresponding" to this class of hydroximic acid derivatives are referred to as peroxycarbonates.

A fifth class of particularly effective initiators includes hydroximic acid derivatives wherein $R_1$ is above defined and $R_2$ and $R_3$ are selected from the groups represented by $R_4$ and $R_5$, wherein $R_4$ is selected from the class consisting of substituted or unsubstituted: $C_1-C_{20}$ alkyl, $C_2-C_{20}$ alkenyl, cyclohexyl, phenyl and $C_7-C_{20}$ aralkyl and $R_5$ is selected from the class consisting of substituted or unsubstituted: $C_2-C_{21}$ alkylcarbonyl, $C_3-C_{21}$ alkenylcarbonyl, $C_7-C_{21}$ cyclohexylcarbonyl, $C_6-C_{21}$ phenylcarbonyl and $C_8-C_{21}$ aralkyl; provided that if $R_2$ is a group represented by $R_4$, then $R_3$ is a group represented by $R_5$ and if $R_2$ is a group represented by $R_5$, then $R_3$ is a group represented by $R_4$. Compounds representative of this class include tertiary butyl-O-pivaloyl dodecanehydroximate, ethyl-O-phenoxyacetyl dodecanehydroximate, ethyl-O-methacryloyl dodecanehydroximate, tertiary butyl-O-ethylhexanoyl benzohydroximate, tertiary butyl-O-benzoyl acetohydroximate, and tertiary butyl-O-benzoyl benzohydroximate. The peroxides "corresponding" to this class of hydroximic acid derivatives are referred to as peresters. The preferred initiators of this fifth class comprise hydroximic acid derivatives wherein $R_1$ is $C_2-C_{20}$ alkyl, $R_2$ is $C_1-C_5$ alkyl, and $R_3$ is $C_7-C_{21}$ phenylcarbonyl. Compounds representative of this preferred class include ethyl-O-benzoyl propiohydroximate, ethyl-O-benzoyl dodecanehydroximate, methyl-O-2,4-dichlorobenzoyl pivalohydroximate and tertiary butyl-O-benzoyl n-butyrohydroximate. Ethyl-O-benzyl dodecane hydroximate in displaying very good activity and efficiency in radical reactions, is most preferred. In addition the dodecane nitrile formed in reactions employing ethyl-O-benzoyl dodecane hydroximate contains little or no toxicity.

The compounds of the present invention may be prepared from the corresponding imidates. The imidates may be prepared employing known procedures.

A nitrile of the formula: $R_1-C\equiv N$, wherein $R_1$ is above defined; is treated with an alcohol in the presence of an acid such as hydrochloric acid. A salt is produced and the reaction mixture is then treated with an aqueous solution of an alkali carbonate and an organic solvent in which the imidate is soluble, such as, for example, ether. The phases are separated and the organic phase is dried and then evaporated to yield an imidate of the formula:

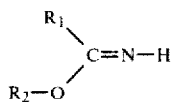

The imidate of formula (II) is heated with a hydroxylamine salt, such as hydroxylammonium chloride or hydroxylammonium sulfate. The reaction is carried out in the presence of an organic solvent, such as ether, benzene, toluene, hexane or dichloromethane. The reaction is generally proceeds with stirring and within a temperature range of 0°–40° C. Upon completion of the reaction, the organic phase is separated from the aqueous phase and is then dried employing drying agents such as sodium sulfate and magnesium sulfate. The organic solvent is subsequently evaporated to yield an hydroximate of the formula:

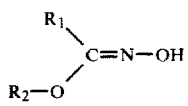

Other hydroximic acid derivatives are obtained by allowing the hydroximate of formula (III) to react with a compound of the formula $R_3$—Cl, provided that $R_3$ is not hydrogen. This reaction is carried out in an organic solvent, such as ether, benzene, toluene, hexane, or dichloromethane. The reaction proceeds in the presence of a base, such as, for example, pyridine, sodium bicarbonate and potassium carbonate. In general, the reaction is carried out with stirring and within a temperature range of from 0°–40° C. A salt which formed is removed by filtration and the organic solvent is evaporated to yield a compound of formula (I).

The following examples further illustrate the present invention. Examples 1–7 describe the preparation of the initiators employed in the procedures described in Examples 8–11.

EXAMPLE 1

A mixture containing fourteen grams of hydroxylammonium chloride dissolved in 100 ml of water was added to 100 ml of ether in a 250 ml flask. The resulting mixture was cooled to 2° C. and 45.4 g of ethyldodecaneimidate were added to the mixture with stirring. The reaction mixture was stirred for an additional 30 minutes at 2° C. The layers were separated and the aqueous layer was extracted three times with 75 ml of ether. The ether layer and washings were combined and then dried over sodium sulfate and concentrated to yield 37.3 g (77% yield) of ethyl dodecane hydroximate as a white, solid substance. IR and NMR analyses confirmed the structure.

EXAMPLE 2

In a 3-necked flask equipped with stirrer, therometer and dropping funnel a mixture containing 12.5 g of ethyldodecanehydroximate and 4.0 g of pyridine dissolved in 60 ml of ether was cooled to 2° C. To the resulting solution was slowly added a solution containing 7.1 g of benzoyl chloride in 10 ml of ether. The reaction mixture was stirred for 5 hours at 20° C. and then filtered to remove, pyridine hydrochloride salt, a white precipitate. The ether solution was concentrated to yield 17.0 g (100% yield) of ethyl-O-benzoyl dodecane hydroximate as a liquid. The structure was confirmed by IR and NMR analyses.

EXAMPLE 3

In a three-necked flask equipped with stirrer, therometer and dropping funnel a mixture containing 3.0 g of ethylpropiohydroximate and 2.0 g of pyridine dissolved in 25 ml of ether was cooled to 2° C. To the resulting solution was slowly added a solution of 3.6 g of benzoyl chloride in 10 ml of ether. The reaction mixture was stirred for 3.5 hours at 20° C. and then filtered to remove, pyridine hydrohloride salt, a white precipitate. The ether solution was concentrated to yield 4.9 g (66% yield) of ethyl-O-benzoylpropiohydroximate as a white solid substance. IR and NMR analyses confirmed the structure.

The following compounds were also prepared in accordance with the above procedure:
ethyl-O-benzoyl acetohydroximate
ethyl-O-terephthaloyl acetohydroximate
ethyl-O-azeloyl acetohydroximate
ethyl-O-methacryloyl acetohydroximate
ethyl-O-benzoyl benzohydroximate
butyl-O-acetyl benzohydroximate
ethyl-O-pivaloyl dodecanehydroximate
ethyl-O-phenoxyacetyl dodecanehydroximate
ethyl-O-p.toluenesulfonyl dodecanehydroximate

EXAMPLE 4

In a three-necked flask of 200 ml, equipped with stirrer, therometer and dropping funnel a mixture containing 12.5 g of ethyldodecanehydroximate and 4.0 g of pyridine dissolved in 60 ml of dichloromethane was cooled to 3° C. To the resulting mixture was added dropwise 6.2 g of isopropylchloroformate over a period of 15 minutes. The reaction mixture was stirred for 1 hour at 3° C. and then for 24 hours at 20° C. The reaction mixture was filtered and the dichloromethane solution was dried and concentrated to yield 14.2 g (85% yield) of ethyl-O-(isopropyloxycarbonyl) dodecane hydroximate. The structure was confirmed by IR and NMR analyses.

EXAMPLE 5

To a solution containing 47.2 g of potassium tertiarybutylate in 400 ml. of tetrahydrofurane at 25° C. was dropwise added a solution containing 31.2 g of benzocarboximidoyl in 100 ml. of tetrahydrofurane chloride. The resulting reaction mixture was stirred for 22 hours at 20° C. after which period, carbon dioxide was introduced for a period of 2 hours. To the resultant mixture was added 250 ml. of ether and 250 ml. of water. The layers were separated and the organic layer was concentrated by evaporation at 40° C., to yield 26.3 g of tertiary-butyl benzohydroximate. The structure was confirmed by IR and NMR analysis. The tertiarybutyl benzohydroximate was converted to tertiarybutyl-O-benzoyl benzohydroximate employing benzoyl chloride in accordance with the procedure of Example 3.

EXAMPLE 6

To 100 ml of absolute ethanol in a three-necked flask of 250 ml, equipped with stirrer, thermometer and cooler, was slowly added 4.6 g of sodium metal in portions, at 20° C. After a solution was obtained, 14.5 g of ethyl benzohydroximate and 15.6 g of ethyl iodide were sequentially added. The reaction mixture was heated to 60° C. and then stirred for 2 hours. The reaction mixture was cooled and then 65 ml of water, 50 ml of ether and 50 ml of petroleum ether were added to the mixture. The layers were separated and the organic layer was dried over potassium carbonate and concentrated at 20° C. to yield 9.8 g (65% yield) of ethyl-o-ethyl benzohydroximate as a light yellow liquid. The structure of the compound was confirmed by IR and NMR analyses.

EXAMPLE 7

To 50.2 g of O-benzoyl benzohydroximic acid sodium salt, and 550 ml of diethylether in a three-necked 1 liter flask, equipped with stirrer, thermometer, cooler and dropping funnel was added a solution containing 25.3 g of benzoyl chloride in 50 ml of diethylether, over a period of 15 min. at a temperature of 20° C. The reaction mixture was then stirred for 30 hours at room temperature. The mixture was filtered and the filtrate evaporated under reduced pressure, to produce a residue containing 44.2 g of a solid crude product. The crude product was purified by adding with 100 ml of pentane at 0° C. The resulting solution was filtered to yield a solid substance which was dried and then crystallized from benzene to yield 34.2 g (55% yield) of benzoic-O-benzoyl benzohydroximic anhydride. The structure was confirmed by IR and NMR analyses.

EXAMPLE 8

The initiating capacity of compounds prepared in Examples 1 to 7, was determined employing a modified so-called "SPI" test, as described in NEN 20584 (1969) and ISO Standard R 584 (1967). This test was executed by dissolving 0.069 g of an initiator in 6 g of resin. The resin consisted of 64 parts of a polycondensate of 1 mol phthalic anhydride, 1 mol maleic anhydride, 2.2 mol ethylene glycol and of 36 parts styrene (type Ludopal P-6, BASF). The reaction mixture was placed in a bath of a temperature of 150° C., and the progress of the resin temperature was measured as a function of time. Table I shows peak times and maximal temperatures. The peak times are parameters for the reaction rate and the maximal temperatures represent the efficiency of the initiator. The peak time and maximal temperature for a resin without the addition of an initiator was also measured. The observed peak for a resin without an initiator is caused by a purely thermal curing of the resin.

TABLE I

| Initiator | peak time (min.) | max. temp. (°C.) |
|---|---|---|
| none | 24.3 | 178 |
| ethyl-O-benzoyl acetohydroximate | 6.3 | 244 |
| ethyl-O-terephthaloyl acetohydroximate | 6.2 | 258 |
| ethyl-O-azeloyl acetohydroximate | 6.1 | 270 |
| ethyl-O-methacryloyl acetohydroximate | 5.6 | 258 |
| ethyl-O-benzoyl propiohydroximate | 5.9 | 258 |
| ethyl-O-benzoyl benzohydroximate | 6.2 | 225 |
| tert.-butyl-O-benzoyl benzohydroximate | 7.8 | 249 |
| butyl-O-acetyl benzohydroximate | 5.8 | 238 |
| ethyl-O-benzoyl dodecane hydroximate | 5.3 | 263 |
| ethyl-O-(isopropyloxycarboxy) dodecanehydroximate | 3.1 | 282 |
| ethyl-O-pivaloyl dodecanehydroximate | 5.8 | 268 |
| ethyl-O-phenoxyacetyl dodecanehydroximate | 4.2 | 266 |
| ethyl-O-p.toluenesulfonyl dodecanehydroximate | 5.1 | 273 |
| ethyl dodecanehydroximate | 4.9 | 269 |
| ethyl-O-ethyl benzohydroximate | 9.3 | 237 |
| benzoic-O-benzoyl benzohydroximic anhydride | 5.3 | 259 |

The results illustrate that the compounds of the present invention are effective initiators in the copolymerization of unsaturated polyester resins.

EXAMPLE 9

The procedure described in Example 8 were repeated, except that the resin consisted of 60 parts of a polycondensate of 1 mol phthalic anhydride, 1 mol maleic anhydride and 2.2 mol ethylene glycol and of 40 parts diallyl phthalate (type Synolite 311, from Synres), and the bath temperature was 200° C.

The results are shown in Table II.

TABLE II

| Initiator | peak time (min.) | max. temp. (°C.) |
|---|---|---|
| none | | 200 |
| ethyl-O-benzoyl acetohydroximate | 2.4 | 259 |
| ethyl-O-terephthaloyl acetohydroximate | 2.9 | 278 |
| ethyl-O-azeloyl acetohydroximate | 3.1 | 262 |
| ethyl-O-methacryloyl acetohydroximate | 2.6 | 228 |
| ethyl-O-benzoyl propiohydroximate | 3.1 | 263 |
| ethyl-O-benzoyl benzohydroximate | 2.4 | 247 |
| butyl-O-acetyl benzohydroximate | 2.7 | 251 |
| ethyl-O-benzoyl dodecanehydroximate | 3.0 | 260 |
| ethyl-O-(isopropyloxycarboxy) dodecanehydroximate | 3.1 | 282 |
| ethyl-O-pivaloyl dodecanehydroximate | 3.1 | 293 |
| ethyl-O-phenoxyacetyl dodecanehydroximate | 2.6 | 270 |
| ethyl-O-p.toluenesulfonyl dodecanehydroximate | 6.3 | 213 |
| ethyl dodecanehydroximate | 5.5 | 240 |
| benzoic-O-benzoyl benzohydroximic anhydrade | 3.7 | 272 |

EXAMPLE 10

In a Waring blender, 100 g of low density polyethylene powder (type Alkathene 025.030, from ICI) were mixed with 1 g of triallyl cyanurate and 5 mmol of an initiator. The cross-linking behavior of the mixture was determined in a Monsanto rheometer. The test procedure employed is described in ASTM D-2084-79, BS 1673(10) 1977 and ISO 3417 (1977); and consists of embedding an oscillating disc (a so-called micro-die; 5° osc., 1.7 Hz) in the mixture to be cross-linked, in a heated press and the temperature of the mixture is brought to 220° C. During cross-linking, the resistance encountered by the disc is recorded as a function of time. From the resulting curve it is possible to calculate the $t_{90}$ (min.) and the (delta) torque (Nm) [$\Delta$torque = $M_H - M_L$; $M_H$ = maximum torque, $H_L$ = minimum torque]. These parameters are a measure of the reaction rate and efficiency of the initiator employed.

The gel fraction of the cross-linked material of a number of mixtures, after they had been cross-linked in the hot press at 220° C., was determination by means of an extraction method. This method was carried out in boiling xylene and is described in the Standards BS 5468-1977 and ANSI/ASTM D 2765-68 (1972). The gel fraction (in %) represents which percentage of cross-linked polymer will not dissolve under the conditions of the test over a specific time period. The gel fraction is a measure for the degree of cross-linking of the polymer and thus the efficiency of the initiator.

The results of Table III indicate that the compounds of the present invention are effective initiators for cross-linking low density polyethylene.

TABLE III

| Initiator | Rheometer Test t90 (min) | Rheometer Test Δ torque (Nm) | Extraction Test curing time (min) | Extraction Test gel fract. (%) |
|---|---|---|---|---|
| none | — | 0 | 30 | 0 |
| ethyl-O-benzoyl acetohydroximate | 23.5 | 2.69 | 25 | 85 |
| ethyl-O-terephthaloyl acetohydroximate | 23.5 | 2.04 | 25 | 81 |
| ethyl-O-azeloyl acetohydroximate | 30.2 | 1.64 | | |
| ethyl-O-methacryloyl acetohydroximate | 31.0 | 1.59 | | |
| ethyl-O-benzoyl propiohydroximate | 21.2 | 2.17 | 25 | 79 |
| ethyl-O-benzoyl benzohydroximate | 17.9 | 2.70 | 20 | 84 |
| butyl-O-acetyl benzohydroximate | 20.1 | 2.23 | 25 | 81 |
| ethyl-O-benzoyl dodecane hydroximate | 18.5 | 2.09 | 20 | 80 |
| ethyl-O-(isopropyloxycarboxy) dodecane hydroximate | 56.5 | 2.55 | 60 | 77 |
| benzoic-O-benzoyl benzohydroximic anhydride | 31.1 | 2.36 | | |

EXAMPLE 11

On a two-roll mill, 100 g of high density polyethylene (type Stamylan 9300, from DSM) were mixed for 3 minutes at 150° C. with 1 g of triallyl cyanurate and 5 mmol ethyl-O-benzoyl dodecane hydroximate. A mixture of 100 g of high density polyethylene and 2.5 mmol of 1,3-bis-(tertiary butylperoxyisopropyl) benzene (Perkadox 14, from Akzo) was prepared in an analogous manner. As a result both mixtures contained the same number of gram-equivalents of initiator. The cross-linking behavior of both mixtures was then determined by means of a Monsanto rheometer at 220° and 180° C., respectively. After cross-linking in a hot press (during 25 minutes at 220° C. and 15 minutes at 180° C., respectively), the gel fraction of both mixtures was determined in accordance with the procedures described in Example 10.

The results in Table IV indicate, that ethyl-O-benzoyl dodecane hydroximate is a highly effective initiator for cross-linking high density polyethylene. In addition, the permissible processing temperature is considerably higher, than is with most typical organic peroxides.

TABLE IV

| Initiator | temp. (°C.) | Rheometer Test t90 (min) | Rheometer Test Δ torque (Nm) | Extraction Test gel fract (%) |
|---|---|---|---|---|
| none | 220 | — | 0 | 0 |
| ethyl-o-benzoyl dodecane hydroximate | 220 | 21.5 | 2.00 | 78 |
| 1,3-bis-(tert.-butylperoxyisopropyl) benzene | 180 | 11.8 | 2.03 | 81 |

We claim:

1. In an improved process for initiating radical reactions, the improvement comprises employing as an initiator a compound of the formula

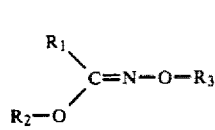

wherein
$R_1$ is selected from the class consisting of substituted or unsubstituted: $C_1$–$C_{22}$ alkyl, $C_2$–$C_{22}$ alkenyl, $C_6$–$C_{20}$ cyclohexyl, $C_6$–$C_{20}$ phenyl and $C_7$–$C_{20}$ aralkyl;

$R_2$ is selected from the class consisting of substituted or unsubstituted: $C_1$–$C_{20}$ alkyl, $C_2$–$C_{20}$ alkenyl, $C_6$–$C_{20}$ cyclohexyl, $C_6$–$C_{20}$ phenyl, $C_7$–$C_{20}$ aralkyl, $C_2$–$C_{21}$ alkylcarbonyl, $C_3$–$C_{21}$ alkenylcarbonyl, $C_7$–$C_{21}$ cyclohexylcarbonyl, $C_7$–$C_{21}$ phenylcarbonyl, $C_8$–$C_{21}$ aralkylcarbonyl, $C_7$–$C_{21}$ alkoxycarbonyl, $C_3$–$C_{21}$ alkenyloxycarbonyl, $C_7$–$C_{21}$ cyclohexyloxycarbonyl, $C_7$–$C_{21}$ phenoxycarbonyl and $C_8$–$C_{21}$ aralkyloxycarbonyl; and $R_3$ is hydrogen, a group selected from the class consisting of substituted or unsubstituted: $C_1$–$C_{20}$ alkyl, $C_2$–$C_{20}$ alkenyl, $C_6$–$C_{20}$ cyclohexyl, $C_6$–$C_{20}$ phenyl, $C_7$–$C_{20}$ aralkyl, $C_2$–$C_{21}$ alkylcarbonyl, $C_3$–$C_{21}$ alkenylcarbonyl $C_7$–$C_{21}$ cyclohexylcarbonyl, $C_7$–$C_{21}$ phenylcarbonyl, $C_8$–$C_{21}$ aralkylcarbonyl, $C_7$–$C_{21}$ alkoxycarbonyl, $C_3$–$C_{21}$ alkenyloxycarbonyl, $C_7$–$C_{21}$ cyclohexyloxycarbonyl, $C_7$–$C_{21}$ phenyloxycarbonyl and $C_8$–$C_{21}$ aralkyloxycarbonyl; a

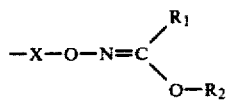

group wherein X is substituted or unsubstituted: $C_1$–$C_{12}$ alkylene, $C_2$–$C_{12}$ alkenylene, $C_6$–$C_{12}$ cycloalkylene or phenylene; or a —$SO_2Y$ group wherein Y is substituted or unsubstituted: $C_1$–$C_{20}$ alkyl, $C_6$–$C_{20}$ cycloalkyl or phenyl.

2. A process according to claim 1, wherein
$R_1$ is selected from the class consisting of $C_1$–$C_{22}$ alkyl, $C_2$–$C_{22}$ alkenyl, $C_6$–$C_{20}$ cyclohexyl, $C_6$–$C_{20}$ phenyl and $C_7$–$C_{20}$ aralkyl;

$R_2$ is selected from the class consisting of $C_1$–$C_{20}$ alkyl, $C_2$–$C_{20}$ alkenyl, $C_6$–$C_{20}$ cyclohexyl, $C_6$–$C_{20}$ phenyl, $C_7$–$C_{20}$ aralkyl, $C_2$–$C_{21}$ alkylcarbonyl, $C_3$–$C_{21}$ alkenylcarbonyl, $C_7$–$C_{21}$ cyclohexylcarbonyl, $C_7$–$C_{21}$ phenylcarbonyl, $C_8$–$C_{21}$ aralkylcarbonyl, $C_7$–$C_{21}$ alkoxycarbonyl, $C_3$–$C_{21}$ alkenyloxycarbonyl, $C_7$–$C_{21}$ cyclohexyloxycarbonyl, $C_7$–$C_{21}$ phenoxycarbonyl and $C_8$–$C_{21}$ aralkyloxycarbonyl; and $R_3$ is hydrogen, a group selected from the class consisting of $C_1$–$C_{20}$ alkyl, $C_2$–$C_{20}$ alkenyl, $C_6$–$C_{20}$ cyclohexyl, $C_6$–$C_{20}$ phenyl, $C_7$–$C_{20}$ aralkyl, $C_2$–$C_{21}$ alkylcarbonyl, $C_3$–$C_{21}$ alkenylcarbonyl $C_7$–$C_{21}$ cyclohexylcarbonyl, $C_7$–$C_{21}$ phenylcarbonyl, $C_8$–$C_{21}$ aralkylcarbonyl, $C_7$–$C_{21}$ alkoxycarbonyl, $C_3$–$C_{21}$ alkenyloxycarbonyl, $C_7$–$C_{21}$ cyclohexyloxycarbonyl, $C_7$–$C_{21}$ phenyloxycarbonyl and $C_8$–$C_{21}$ aralkyloxycarbonyl; a

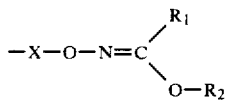

group wherein X is $C_1$–$C_{12}$ alkylene, $C_2$–$C_{12}$ alkenylene, $C_6$–$C_{12}$ cycloalkylene or phenylene; or a —$SO_2Y$ group wherein Y is $C_1$–$C_{20}$ alkyl, $C_6$–$C_{20}$ cycloalkyl or phenyl.

3. A process according to claim 2, wherein $R_2$ is $C_1$–$C_{20}$ alkyl, $C_2$–$C_{20}$ alkenyl, cyclohexyl or $C_7$–$C_{20}$ aralkyl, and $R_3$ is hydrogen.

4. A process according to claim 2, wherein $R_2$ and $R_3$ are independently $C_1$–$C_{20}$ alkyl, cyclohexyl or $C_7$–$C_{20}$ aralkyl.

5. A process according to claim 2, wherein $R_2$ and $R_3$ are independently $C_7$–$C_{21}$ phenylcarbonyl.

6. A process according to claim 2, wherein $R_2$ is $C_1$–$C_{20}$ alkyl, $C_2$–$C_{20}$ alkenyl, cyclohexyl, phenyl or $C_7$–$C_{20}$ aralkyl, and $R_3$ is $C_2$–$C_{21}$ alkoxycarbonyl, $C_3$–$C_{21}$ alkenyloxycarbonyl, $C_7$–$C_{21}$ cyclohexyloxycarbonyl, $C_7$–$C_{21}$ phenyloxycarbonyl or $C_8$–$C_{21}$ aralkyloxycarbonyl.

7. A process according to claim 2, wherein $R_2$ and $R_3$ are selected from the class represented by $R_4$ and $R_5$, wherein $R_4$ is selected from the class consisting of $C_1$–$C_{20}$ alkyl, $C_2$–$C_{20}$ alkenyl, cyclohexyl, phenyl and $C_7$–$C_{20}$ aralkyl and $R_5$ is selected from the class consisting of $C_2$–$C_{21}$ alkylcarbonyl, $C_3$–$C_{21}$ alkenylcarbonyl, $C_7$–$C_{21}$ cyclohexylcarbonyl, $C_6$–$C_{21}$ phenylcarbonyl and $C_8$–$C_{21}$ aralkyl; provided that if $R_2$ is a group represented by $R_4$, then $R_3$ is a group represented by $R_5$ and if $R_2$ is a group represented by $R_5$, then $R_3$ is a group represented by $R_4$.

8. A process according to claim 7, wherein $R_1$ is $C_2$–$C_{20}$ alkyl, $R_2$ is $C_1$–$C_5$ alkyl and $R_3$ is $C_7$–$C_{21}$ phenylcarbonyl.

9. A process according to claim 8, wherein the initiator is ethyl-O-benzoyl dodecanehydroximate.

10. In a process for copolymerizing unsaturated polyester resins, wherein the improvement comprises employing an initiator of claim 1 is employed.

11. In a process for cross-linking polymers, wherein the improvement comprises employing an initiator of claim 1.

12. In a process for cross-linking (co)polymers of ethylene, wherein the improvement comprises employing an initiator of claim 1 is employed.

13. A process according to claim 1, wherein $R_2$ is substituted: $C_1$–$C_{20}$ alkyl, $C_2$–$C_{20}$ alkenyl, cyclohexyl or $C_7$–$C_{20}$ aralkyl, and $R_3$ is hydrogen.

14. A process according to claim 1, wherein $R_2$ and $R_3$ are independently substituted: $C_1$–$C_{20}$ alkyl, cyclohexyl or $C_7$–$C_{20}$ aralkyl.

15. A process according to claim 1, wherein $R_2$ and $R_3$ are independently substituted $C_7$–$C_{21}$ phenylcarbonyl.

16. A process according to claim 1, wherein $R_2$ is substituted: $C_1$–$C_{20}$ alkenyl, cyclohexyl, phenyl or $C_7$–$C_{20}$ aralkyl, and $R_3$ is substituted: $C_2$–$C_{21}$ alkoxycarbonyl, $C_3$–$C_{21}$ alkenyloxycarbonyl, $C_7$–$C_{21}$ cyclohexyloxycarbonyl, $C_7$–$C_{21}$ phenyloxycarbonyl or $C_8$–$C_{21}$ aralkyloxycarbonyl.

17. A process according to claim 1, wherein $R_2$ and $R_3$ are selected from the class represented by $R_4$ and $R_5$, wherein $R_4$ is selected from the class consisting of substituted: $C_1$–$C_{20}$ alkyl, $C_2$–$C_{20}$ alkenyl, cyclohexyl, phenyl and $C_7$–$C_{20}$ aralkyl and $R_5$ is selected from the class consisting of substituted: $C_2$–$C_{21}$ alkylcarbonyl, $C_3$–$C_{21}$ alkenylcarbonyl, $C_7$–$C_{21}$ cyclohexylcarbonyl, $C_6$–$C_{21}$ phenylcarbonyl and $C_8$–$C_{21}$ aralkyl; provided that if $R_2$ is a group represented by $R_4$, then $R_3$ is a group represented by $R_5$ and if $R_2$ is a group represented by $R_5$, then $R_3$ is a group represented by $R_4$.

18. A process according to claim 1, wherein $R_1$ is $C_2$–$C_{20}$ alkyl, $R_2$ is $C_1$–$C_5$ alkyl and $R_3$ is a substituted $C_7$–$C_{21}$ phenylcarbonyl.

19. A process according to claim 1, wherein the substituted $R_1$, $R_2$, $R_3$, X or Y groups contain substituents selected from the class consisting of alkyl, cyclohexyl, phenyl, phenyloxy, aralkyl, aralkyloxy, carboxyl, amino, nitro and halo.

* * * * *